June 26, 1923.

E. A. KERSTEIN

METER CONSTRUCTION

Filed Jan. 13, 1922

WITNESSES

INVENTOR
E. A. Kerstein
BY
ATTORNEYS

June 26, 1923.

E. A. KERSTEIN

METER CONSTRUCTION

Filed Jan. 13, 1922

WITNESSES

INVENTOR
E. A. Kerstein
BY
ATTORNEYS

Patented June 26, 1923.

1,460,327

UNITED STATES PATENT OFFICE.

ERNEST ARTHUR KERSTEIN, OF ALBANY, NEW YORK.

METER CONSTRUCTION.

Application filed January 13, 1922. Serial No. 528,911.

*To all whom it may concern:*

Be it known that I, ERNEST A. KERSTEIN, a citizen of the United States, and resident of Albany, in the county of Albany and State of New York, have invented a new and Improved Meter Construction, of which the following is a full, clear, and exact description.

My invention relates to a meter construction, and aims to provide certain new and useful improvements in connection with a device of this character.

In connection with meters, and more particularly gas meters, it is a well appreciated fact that considerable difficulty has been experienced. Thus it has been customary to provide a link motion which was operated by means of a diaphragm or bellows, and which in turn operated a shaft connected with the registering means, this shaft being in the nature of a crank shaft and having its lower end supported by the partition extending between the bellows and registering mechanism. The slightest causes would often effect a distortion or displacement of this crank shaft, and as a consequence, the results shown by the registering mechanism would be inaccurate.

Furthermore difficulty has been experienced in the operating arms for the slide valves in that the latter have not shown a tendency to respond to every impulse of the prime mover for the same. Also when an inspection of the meter was to be undertaken, and it was desired to examine the diaphragm it was necessary to remove the bottom of the meter casing and this in itself was an extremely tedious operation, incident to the peculiar type of connection existing between the sides and bottom of the casing, aside from the fact that when the bottom was dropped the bellows guide carried by the bottom would also drop, rendering its subsequent proper disposition with respect to the bellows extremely difficult.

Thus it is the primary object of the present invention to provide a meter of general conventional construction, the parts of which will however be modified and improved to such an extent as to virtually preclude of any objections arising incident to a distortion or displacement of the crank shaft.

Among further objects of this invention is the provision of an improved slide valve actuator, and in the association of the base of the meter casing with the sides of the latter in such a manner that this base may readily be removed for purposes of renewal, etc., it being noted that by means of my improved construction it will not be necessary to move the bellows guide when dropping the base.

Further objects of this invention will become apparent in the annexed specification taken in connection with the drawings, which latter illustrate one practical embodiment of the same, and in which.

Figure 1:
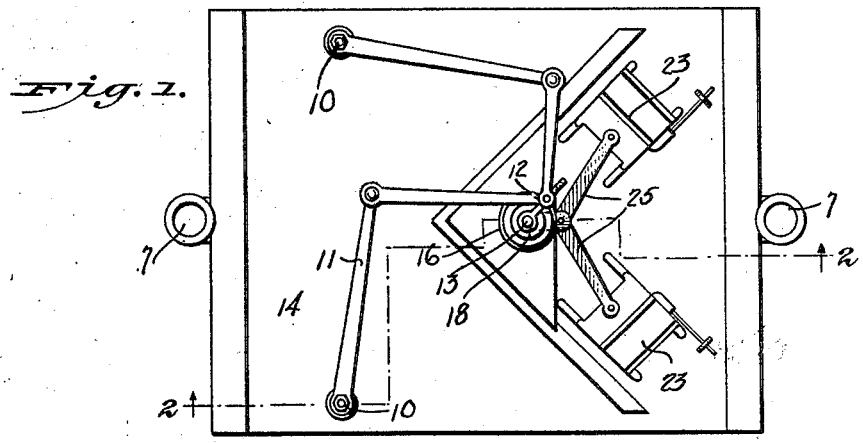
Figure 1 is a plan view of the upper portion of a meter embodying my improved construction and showing the top of the casing removed therefrom.

As in the well known construction it will be seen that the reference numeral 5 indicates the casing provided with a top 6, it being noted that feed pipes 7 enter the casing and are connected (not shown) to the diaphragm or bellows 8. Also actuating arms 9 have one of their ends connected to the bellows 8 their opposite ends being carried by shafts 10 rotatably supported within the casing. Further these shafts carry groups of links 11 which latter are inturned and connected to an arm 12 carried by a shaft 13.

The foregoing, as aforestated, is more or less conventional construction, and forms no part of this invention. However it will be noted that the shaft 13 is not all conventional construction, but rather that the same, instead of bearing against the baffle 14, passes through a shield 15 secured to this baffle, and a stuffing box is secured to this shield and acts as a support for the said shaft 13.

Figure 4:
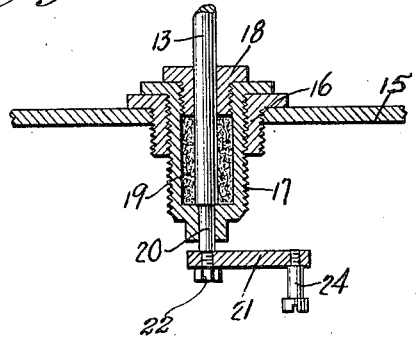
Figure 4 is an enlarged fragmentary sectional view taken along the line 4—4 of Figure 2.

Referring in detail to this stuffing box it will be noted, reference being had to Figure 4, that the same preferably includes a collar 16 carrying a socket 17, the upper end of which is closed by a plug 18, the body of this socket being filled with suitable material 19. The shaft 13 extends through openings in the plug 18 and base of the socket 17, and it is to be noted that this shaft may conveniently be provided with a reduced portion 20 to thus form a shoulder cooperating with the socket 17 to prevent the shaft 13 from dropping.

Thus assuming that certain of the parts of the meter are being renewed, it will be understood that by means of my improved construction it will not be necessary to displace the stuffing box or the shaft carried thereby, so that the original position of the shaft 13 and crank 21 carried thereby is at all times maintained, it being noted in this connection that the stuffing box offers considerable bearing surface, thus maintaining the shaft 13 in the position in which it has been originally set. Also in the event that the shaft would have to be removed it will be seen that this might readily be accomplished by virtue of the screw threaded connection existing between the collar 16 and the shield 15, it being further noted that the crank arm 21 is secured to the reduced portion 20 of the shaft 13 by means of an element 22 which might readily be detached when the entire stuffing box unit and shaft are to be removed.

It will be seen that the connection between the valves 23 and crank arm 21 is greatly improved and that liability of damage while the parts are being removed is materially reduced, incident to the detachable connection established by the bolt 22, as well as the shouldered screw 24, provided adjacent the outer end of the crank arm, which latter screw has connected to it the inner ends of the pitmans 25. Thus the parts are rendered detachable from each other, and it will be obvious that an operator may readily replace virtually any of the elements without damage to the others, aside from the fact that the parts when replaced will again lie in their proper positions.

In the construction of meters, as generally used at present, the bottoms thereof are mounted interiorly of the side walls and the latter are provided with flanges which engage over the bottoms to maintain the same in position. It has been found difficult when repairing a meter of this construction to readily remove the bottom, due to the fact that it is necessary to bend back the flanges of the side walls to disengage the same from the bottom before the latter can be detached from the body of the meter. This often results in the breaking of these flanges causing more or less trouble and inconvenience in making repairs. Also in the known construction of meters the diaphragms are supported by the bottoms and this arrangement entails considerable trouble when making repairs.

Figure 2:
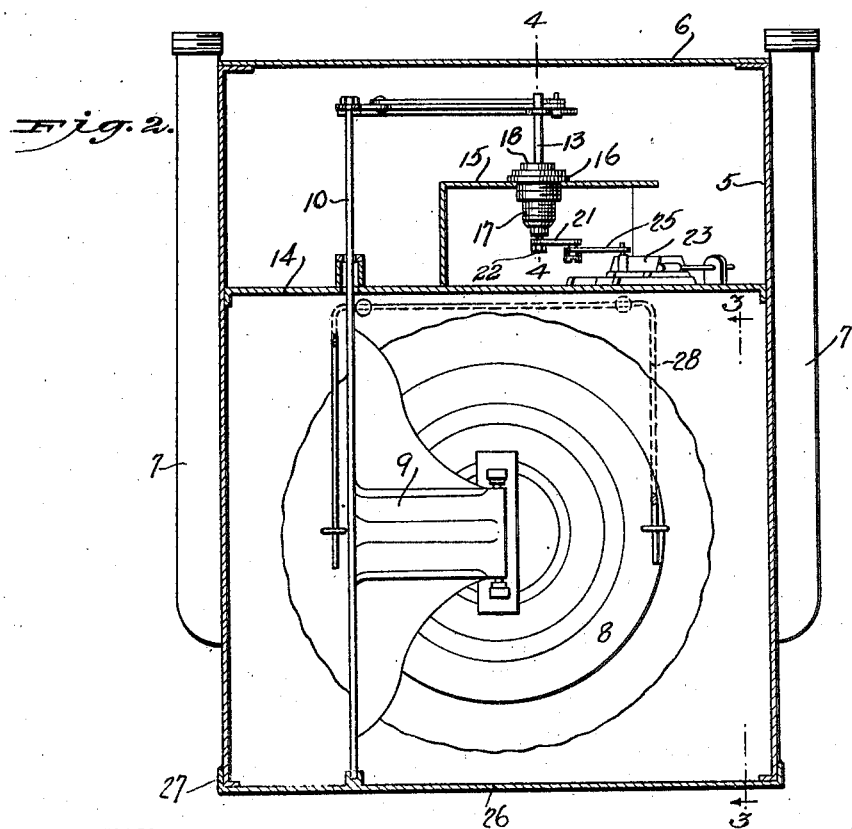
Figure 2 is a transverse sectional view taken along the line 2—2 and in the direction of the arrows indicated in Figure 1.
Figure 3:
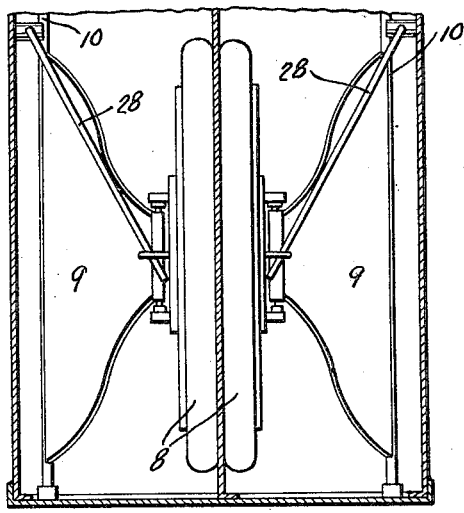
Figure 3 is a sectional side view taken along the line 3—3 and in the direction of the arrows indicated in Figure 2.

With a view of overcoming the above objections and expediting the repair of the bellows or diaphragms 8 it will be noted, reference being had to Figure 2, that the bottom 26 of the casing 5 is preferably flanged as at 27, this flange cooperating with the exterior of the lower edge portion of the casing to properly interengage these parts. Thus when an operator desires to remove this bottom portion of the meter casing it is not necessary to undertake the tedious and sometimes dangerous operation of bending flanges in order to remove the bottom, but merely to force the bottom free of the body of the casing. Also in this connection it will be seen that the diaphragm guides 28 instead of being carried by the bottom of the casing are carried by a fixed portion thereof such as the side walls, so that when the bottom is dropped the guides remain in proper position, and thus it will be obvious that when the bottom is replaced an operator will not find it necessary to go to the trouble which is now required to properly interconnect the guides 28 with the diaphragms. It will be noted that by reason of the connection of the side arms of the guides 28 with the diaphragms and opposite points thereof, said diaphragms will be prevented from expanding and contracting unevenly, that is, the movements of the diaphragms at opposite points will be the same. Thus should the left side of the diaphragm have a tendency to expand more than the right side thereof, this will be prevented by reason of the rigid connection established through the medium of the guide 28 which will cause the right side of the diaphragm to move in unison with the left side thereof.

Thus all of the objects set forth in the preamble of this specification have been accomplished, and it will readily be understood that numerous modifications of structure might readily be resorted to without in the least departing from the scope of my claims; which are:

1. A gas meter including a shaft, means for oscillating said shaft, a stuffing box encircling said shaft, said stuffing box comprising a socket and a plug cooperating with said socket, said shaft extending through said plug and being formed with a reduced end portion extending through the base of said socket member, a collar encircling said socket and carrying the same, and a shield carrying said collar, 2. A gas meter including a shaft, means for oscillating said shaft, a stuffing box encircling said shaft, said stuffing box comprising a socket and a plug cooperating with said socket, said shaft extending through said plug and being formed with a reduced end portion extending through the base of said socket member, a collar encircling said socket and carrying the same, a shield carrying said collar, said shield and collar being formed with inter-engaging screw threads.

ERNEST ARTHUR KERSTEIN.